(12) United States Patent
Campos Macias et al.

(10) Patent No.: US 12,704,828 B2
(45) Date of Patent: Aug. 11, 2026

(54) REAL-TIME PREDICTOR OF HUMAN MOVEMENT IN SHARED WORKSPACES

(71) Applicant: Intel Corporation, Santa Clara, CA (US)

(72) Inventors: Leobardo Emmanuel Campos Macias, Guadalajara (MX); David Gomez Gutierrez, Tlaquepaque (MX); Javier Felip Leon, Hillsboro, OR (US); Jose Ignacio Parra Vilchis, Guadalajara (MX)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 17/953,344

(22) Filed: Sep. 27, 2022

(65) Prior Publication Data

US 2023/0048578 A1 Feb. 16, 2023

(51) Int. Cl.
*G05B 19/4155* (2006.01)
*B25J 9/16* (2006.01)

(52) U.S. Cl.
CPC .......... *G05B 19/4155* (2013.01); *B25J 9/163* (2013.01); *B25J 9/1666* (2013.01); *B25J 9/1669* (2013.01); *G05B 2219/40333* (2013.01)

(58) Field of Classification Search
CPC ........ B25J 9/163; B25J 9/1666; B25J 9/1669; B25J 9/1676; G05B 19/4155; G05B 2219/40333; G05B 2219/39091
See application file for complete search history.

(56) References Cited

U.S. PATENT DOCUMENTS 9,434,074 B2 * 9/2016 Tanigawa ............... B25J 9/1666
2012/0173021 A1 * 7/2012 Tsusaka ................... B25J 13/08 901/46

(Continued)

FOREIGN PATENT DOCUMENTS

CN 110026984 A * 7/2019 ............ B25J 9/1676
CN 110070068 A * 7/2019 ............ G06F 18/22

(Continued)

OTHER PUBLICATIONS

CN-115026868-A translation (Year: 2022).*

(Continued)

*Primary Examiner* — Kyle T Johnson
(74) *Attorney, Agent, or Firm* — Viering, Jentschura & Partner mbB

(57) ABSTRACT

Disclosed herein are systems, devices, and methods for real-time determinations of likelihoods for possible trajectories of a collaborator in a workspace with a robot. The system determines a current kinematic state of the collaborator and determines a goal of the collaborator based on occupancy information about objects in the workspace. The system also determines a possible trajectory for the collaborator based on the goal and the current kinematic state and determines a short-horizon trajectory for the collaborator based on previously observed kinematic states of the collaborator towards the goal. The system also determines a likelihood that the collaborator will follow the possible trajectory based on the short-horizon trajectory, the goal, and the current kinematic state. The system also generates a movement instruction to control movement of the robot based on the likelihood that the collaborator will follow the possible trajectory.

17 Claims, 7 Drawing Sheets

(56) References Cited

U.S. PATENT DOCUMENTS

| | | | | |
|---|---|---|---|---|
| 2018/0099408 | A1* | 4/2018 | Shibata | B25J 9/1697 |
| 2018/0126558 | A1* | 5/2018 | Ooba | B25J 9/163 |
| 2019/0105779 | A1* | 4/2019 | Einav | B25J 9/1689 |
| 2019/0143517 | A1* | 5/2019 | Yang | G06F 18/24133 700/245 |
| 2020/0086487 | A1* | 3/2020 | Johnson | A47J 44/00 |
| 2020/0206928 | A1* | 7/2020 | Denenberg | G01S 17/04 |
| 2021/0309264 | A1* | 10/2021 | Felip Leon | B25J 9/1666 |
| 2021/0379762 | A1* | 12/2021 | Denenberg | B25J 9/1651 |
| 2022/0066456 | A1* | 3/2022 | Ebrahimi Afrouzi | G06F 3/04883 |
| 2022/0105635 | A1* | 4/2022 | Chin | B25J 9/1676 |
| 2022/0193907 | A1* | 6/2022 | Kroeger | B25J 9/163 |
| 2022/0281109 | A1* | 9/2022 | Hayashi | B25J 9/1653 |
| 2023/0048578 | A1* | 2/2023 | Campos Macias | B25J 9/1669 |
| 2023/0112537 | A1* | 4/2023 | Sakamoto | A61B 5/1116 342/22 |
| 2024/0051131 | A1* | 2/2024 | Nakagawa | B25J 19/06 |
| 2024/0066698 | A1* | 2/2024 | Campos Macias | B25J 9/1676 |
| 2024/0210916 | A1* | 6/2024 | Trejo | G06N 5/022 |
| 2026/0077497 | A1* | 3/2026 | Aldana | B25J 9/1664 |

FOREIGN PATENT DOCUMENTS

| | | | | |
|---|---|---|---|---|
| CN | 115026868 A | * | 9/2022 | B25J 17/00 |
| CN | 118493407 A | * | 8/2024 | B25J 9/163 |

OTHER PUBLICATIONS

CN-110026984-A translation (Year: 2019).*

CN-118493407-A translation (Year: 2024).*

CN-110070068-A translation (Year: 2019).*

A_human_following_motion_planning_.pdf (Year: 2021).*

Human_motion_prediction_for_human-robot_collaboration2017 (Year: 2017).*

Motion_planning_with_worker_s_trajectory_prediction_for_assembly_task_partner_robot2012 (Year: 2012).*

Reaching is better when you get what you want (Year: 2016).*

Mayer_Efficient_Path_Planning_for_Modular_Reconfigurable_Robots2024 (Year: 2024).*

Towards_trajectory_based_latent_space_control_for_human_robot_collaboration2025 (Year: 2025).*

Sertac Karaman et al., "Sampling-based Algorithms for Optimal Motion Planning", The international journal of robotics research, arXiv:1105.1186v1, May 5, 2011, 76 pages.

Theodoros Chondrogiannis et al., "Finding k-shortest paths with limited overlap", The VLDB Journal, available at https://doi.org/10.1007/s00778-020-00604-x, Feb. 21, 2020, 25 pages.

Camillo Lugaresi et al. "Mediapipe: A framework for Building Perception Pipelines." arXiv preprint arXiv:1906.08172, Jun. 14, 2019, 9 pages.

Valentin Bazarevsky et al. "BlazePose: On-device Real-time Body Pose tracking" arXiv preprint arXiv:2006.10204, Jun. 17, 2020, 4 pages.

Kaiming He et al., "Mask R-CNN" IEEE international conference on computer vision, 2017, 9 pages.

Yu Xiang et al., "PoseCNN: A Convolutional Neural Network for 6D Object Pose Estimation in Cluttered Scenes", arXiv:1711.00199, May 26, 2017, 10 pages.

Chen Wang et al., "DenseFusion: 6D Object Pose Estimation by Iterative Dense Fusion" arXiv:1901.04780, Jan. 15, 2019, 11 pages.

Claudia Perez-D'arpino et al., "Fast Target Prediction of Human Reaching Motion for Cooperative Human-Robot Manipulation Tasks using Time Series Classification," in 2015 IEEE International Conference on Robotics and Automation (ICRA), May 2015, pp. 6175-6182.

Robert X. Gao et al., "Human Motion Recognition and Prediction for Robot Control", in Advanced Human-Robot Collaboration in Manufacturing, available at https://doi.org/10.1007/978-3-030-69178-3_11, Springer International Publishing, 2021, pp. 261-282.

Ruikun Luo et al., "Unsupervised early prediction of human reaching for human-robot collaboration in shared workspaces" Autonomous Robots, available at https://doi.org/10.1007/s10514-017-9655-8, 2018, vol. 42, No. 3, pp. 631-648.

Andrea Maria Zanchettin et al., "Probabilistic inference of human arm reaching target for effective human-robot collaboration" in 2017 IEEE/RSJ International Conference on Intelligent Robots and Systems (IROS), Sep. 2017, pp. 6595-6600.

* cited by examiner

300b

REAL-TIME PREDICTOR OF HUMAN MOVEMENT IN SHARED WORKSPACES

TECHNICAL FIELD

The disclosure relates generally to prediction of human movement in shared workspaces, and in particular, to systems, devices, and methods that predict arm movements of a human in a complex environment where the human may be performing tasks in the vicinity of and/or collaborating with a robot.

BACKGROUND

Autonomous robots are becoming increasingly widespread in work and personal environments. As the number of robots in such environments increases, so does the risk of hazardous interactions among robots and humans in shared spaces. In order for robots to work safely in an environment with other collaborators, especially humans, it is important to know the planned movements of the collaborator so that the movements of the collaborator do not interfere with the robot's movements. A collaborator may be a human or another robot or autonomous system. For collaborators whose movements are not centrally known (e.g., a human moving in a shared workspace or an autonomous robot that does not advertise/share its planned movement information), it is important to accurately predict the collaborator's movements so that the robot may plan its own movements to avoid interference and unsafe situations. Due to their size and cost, many robots may have limited processing and memory storage capabilities, which may limit the processing and memory capabilities for predicting a collaborator's movements in the environment. As a result, robots may not be able to operate safely in complex environments where the robot must efficiently and accurately predict the kinematics of humans, robots, or other dynamic objects in the shared workspace.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary aspects of the disclosure are described with reference to the following drawings, in which.

DESCRIPTION

Figure 1:
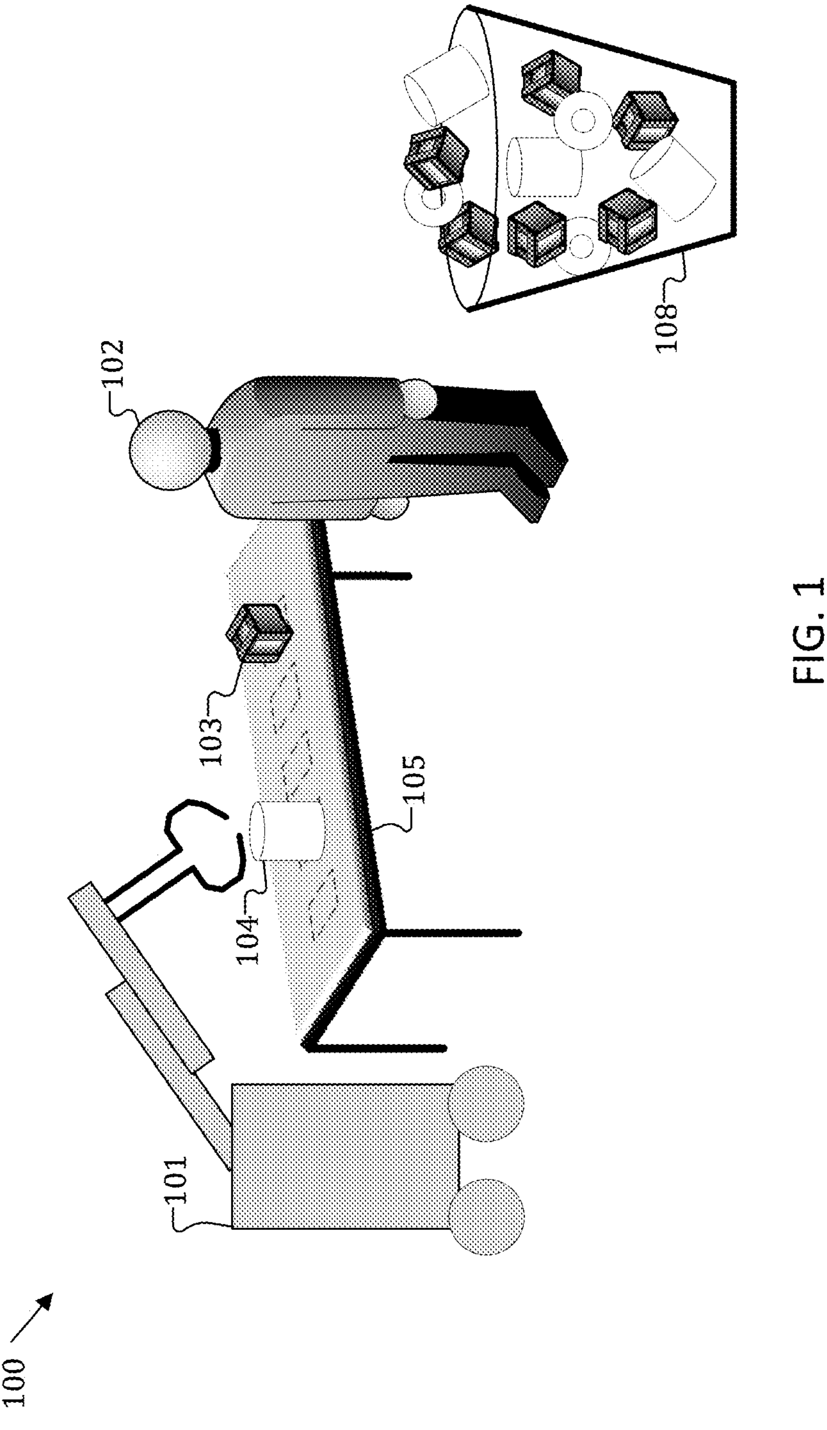
FIG. 1 shows an exemplary collaboration workspace where a robot may be collaborating with a human collaborator.

The following detailed description refers to the accompanying drawings that show, by way of illustration, exemplary details and features.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc., where "[ . . . ]" means that such a series may continue to any higher number). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc., where "[ . . . ]" means that such a series may continue to any higher number).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both "direct" calculations via a mathematical expression/formula/relationship and "indirect" calculations via lookup or hash tables and other array indexing or searching operations.

A "robot" may be understood to include any type of digitally controllable machine that is designed to perform a task or tasks. By way of example, a robot may be an autonomous mobile robot (AMR) that may move within an area (e.g., a manufacturing floor, an office building, a warehouse, etc.) to perform a task or tasks; or a robot may be understood as an automated machine with arms, tools, and/or sensors that may perform a task or tasks at a fixed location; or a combination thereof. In addition, reference is made herein to a "human" or a "person" that may collaborate or share a space with a robot (generally, a "collaborator"). As should be appreciated, the disclosed systems, methods, and devices, are not limited to strictly human collaborations and it should be understood that a "person," "human," or "collaborator" may in fact be non-human entities or other dynamic objects that may share a space with, come into close proximity with, or collaborate with a robot. While the context of the present invention is in robotics, the application of the present invention may include other autonomous systems, including autonomous vehicles, drones, other collaborative machinery, etc.

As robots become more prevalent, robots will likely operate in shared or collaborative workspaces. When the collaborative workspace includes dynamic objects for which future movements are not necessarily known (e.g., where the collaborator is a human or an autonomous robot that does not advertise/share its planned movements), it may be important to accurately predict the planned movements of collaborators in the shared workspace so that the robot may adjust its motion to avoid possible collisions. In order to do this, an accurate prediction of the expected motion/movements of the collaborator at future points in time may be helpful. In particular, when the collaborator may use arms/limbs as part of the collaboration (e.g., to lift, move, and/or deliver an object to a robot), it may be helpful to accurately and quickly predict how the arm will move through various kinematic states from its current position to the target position so that the robot's own movements may be controlled to work safely and in tandem with the movements of the arms/limbs of the collaborator.

FIG. 1 shows an example of a collaborative workspace 100, where a robot 101 is collaborating with a human collaborator 102. For example, the human collaborator 102 may be tasked with picking an object from a supply bin 108 of objects and, depending on the type of object, placing the selected object in a designated area on the workbench 105. As shown in FIG. 1, for example, the robot 101 may be tasked with collecting the placed objects (e.g., can 104 and box 103) while the human collaborator 102 returns to the supply bin 108 to select and place another object on an available designated area on the workbench 105. As should be appreciated from this simple collaboration, there is a risk that the movements of the arms/limbs of the human collaborator 102 may interfere with the movements of the robot 101. To minimize this risk, it may be important to accurately and quickly predict how the arms of the human collaborator 102 will move through various kinematic states while placing objects on the workbench 105 so that the arm movements of the robot 101 may be controlled to work safely and in tandem with the movements of the arms/limbs of the human collaborator 102.

Conventional systems that make such predictions, however, tend to be learning-model-based (e.g., neural networks, deep-learning networks, etc.), where a dataset must be trained with comprehensive training data in order to predict arm/limb movements in different scenarios and for different types of movement targets/goals. In highly dynamic and unpredictable environments, these learning-based models may not be able to quickly and accurately predict movements of the collaborator, especially where a particular constellation of objects, timing, and collaborator goals may not have been accounted for in the training set, making accurate predictions difficult and/or requiring extensive training sets and computing resources. Current systems may not be able to consider the full context of the scene, especially when new obstacles are present that were not previously accounted for in the modeling. Moreover, scene changes or other task variations may require model adjustments or re-training of the model, making their application in highly dynamic, real-world environments less accurate and potentially unsafe.

As should be apparent from the detailed disclosure below, the disclosed prediction system may overcome these shortcomings by including hybrid aspects of a data-driven component and a model-based component, which may use planning algorithms as generative models with capabilities that may depend on the nature of the generative model used. The disclosed prediction system may compare probabilities of multiple potential targets/goals of the collaborator, may be application flexible, may be able to incorporate historical arm/limb-movement information from multiple sources, and may be computationally more efficient than a conventional learning-model-based prediction. The disclosed prediction system may allow for real-time/online predictions, that is, without the need to acquire large sets of training data beforehand, as is typical for learning-model-based approaches. Another advantage of the disclosed prediction system is that it may use a planning algorithm as a generative model, which may consider the full context of the environment, including, among other information, information about obstacles, goals of the collaborator, and semantic labeling of objects. The disclosed prediction system is a data-driven approach that may be used to evaluate any scenario, without the need to acquire new data for the given scenario and regardless of whether the prediction system has been trained for the given scenario. In addition, the disclosed prediction system may include a model-based short-horizon predictor to help predict the motion of the collaborator's arms/limbs which may improve the accuracy of the long term prediction.

The disclosed prediction system may make a real-time Bayesian determination. Such an approach may be understood as an inverse planning problem, where the aim is to generate trajectories of a collaborator's arm movements toward different probable goals, quantifying in a probabilistic fashion how well each trajectory explains the observations of the scene. Thus, the disclosed prediction system may determine a probability distribution toward the goals. One feature of the disclosed prediction system is that a trajectory planning algorithm may be used as a generative model to predict the trajectories of a collaborator's arms/limbs, where the planning algorithm may take into account the context of the environment, including for example obstacles in the environment, constraints to human motion, and potential goals of the collaborator (e.g., objects of interest within the environment for which a collaborator may reach). To predict the likely arm/limb movements of a collaborator, multiple possible trajectories may be generated toward each of the collaborator's potential goals, and a likelihood for each possible trajectory may be determined based on comparing the possible trajectory to the observed trajectory. The disclosed prediction system may improve the probability computation by including, in real-time, the actual observations of the human limbs to predict the movements of the collaborator's limbs over a short horizon. This extended observation-based short-horizon window may then be used to continuously reevaluate the likelihood of each of the various possible trajectories with new observations.

Figure 2:
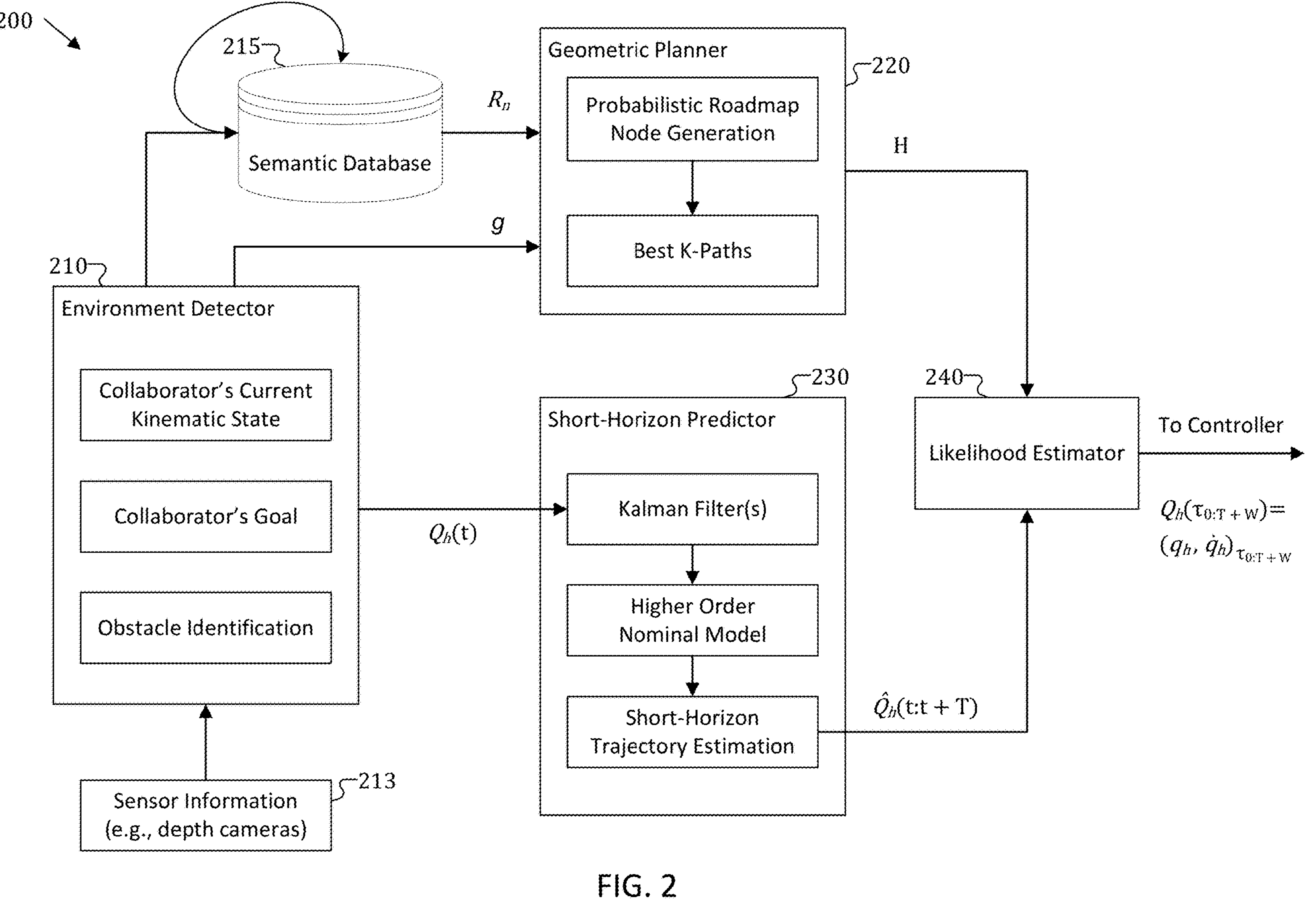
FIG. 2 shows an exemplary prediction system for predicting movements of a collaborator's arms/limbs within a shared workspace with a robot.

FIG. 2 shows a high level view of an exemplary framework for a prediction system 200 that may make real-time determinations of likelihoods for possible trajectories of a collaborator in a workspace with a robot. The determined likelihoods may be used by the robot in its motion controller, so when the robot is controlling its joint positions, it may adapt its movement to avoid collisions with the collaborator, and in particular, collisions with the collaborator's arm/limb movements. As will be discussed in more detail below, the prediction system 200 may include an environment detector 210 that may determine the collaborator's current kinematic state (e.g., current positions, velocities, accelerations, etc. of the joints of the limbs/arms of the collaborator), determine the expected goal of the collaborator's arm/limb movement, and determine the locations, states, and semantics of objects in the environment (e.g., obstacles, items to be moved/worked by the collaborator or robot, a conveyor belt or workbench, etc.), which may be based on sensor information 213 about the environment received from sensors such as depth cameras, Light Detection and Ranging (LiDAR) sensors, red-greed-blue cameras, infrared cameras, radar, etc. The prediction system 200 may also include a geometric planner 220 that uses information from the environment detector 210 in a motion planner that calculates various possible trajectories for the collaborator's arm/limb movements and provides the possible trajectories and their associated costs to a likelihood estimator 240 that iteratively evaluates the likelihood of each possible trajectory by comparing it to the actually observed trajectory. The prediction system 200 may also use a short-horizon predictor 230 that takes information from the environment detector 210 and uses the observed trajectory to estimate a short-term trajectory for the collaborator's arm/limb movements that may be used to improve the likelihood calculation in the likelihood estimator 240.

More details of the environment detector 210 are discussed below. As noted above, the prediction system 200 may utilize information about the environment in which the robot and collaborator are operating in order to more accurately predict trajectories and their likelihoods. As also noted above, the environment may be surveyed by a sensor or sensors (such as depth cameras, Light Detection and Ranging (LiDAR) sensors, red-greed-blue cameras, infrared cameras, radar, etc.) to gather sensor information 213 about the workspace (e.g., the reachable space in which the robot and collaborator may be moving/working), and this sensor information 213 may be provided to the environment detector 210. As should be appreciated, sensors may be located on the robot, as part of the infrastructure of the environment, and/or on other robots within the environment, and the sensor information 213 captured by sensors may be transmitted to (e.g. via a transmitter) and received by (e.g., via a receiver) the environment detector 210.

The environment detector 210 may use sensor information 213 to determine and monitor various aspects of the environment, including the current kinematic state of the collaborator's arms/limbs (or a joint/segment thereof). The kinematic state may include, for example, the positions of an arm/limb of the collaborator, an acceleration of the arm/limb, and a jerk of the arm/limb, etc. The environment detector 210 may define these kinematic states ($Q_h$) as including the set of joint angles ($q_h$) and joint velocities (O) of a simplified model of the collaborator (e.g., a stick-model of the collaborator that represents segments and joints that connect the segments) at a given time, t, where $Q_h(t)=(q_h, \dot{q}_d)_t$. An observed sequence of kinematic states (e.g., a trajectory) from t=0 to t=T is denoted by $\tau_{0:T}$. As should be appreciated, while this example uses joint angles (e.g., a position of a joint formed by two segments of a moveable limb/arm) and joint velocities to define the kinematic state of the collaborator, the kinematic state may be defined using any type or types of state information (e.g., accelerations, jerks, etc.) for any aspect of the collaborator's movement, and the environment detector 210 may use any type of algorithm to determine the kinematic state of the collaborator, including, as examples mediapipe and OpenPose. As will be explained in more detail below, the environment detector 210 may record (e.g., in a memory) and observe a sequence of actual kinematic states over time, which may be used by the short-horizon predictor 230 and/or by the geometric planner 220 to improve trajectory predictions for future points in time. For example, the short-horizon predictor 230 may use the observed sequence of kinematic states of the collaborator to predict the next kinematic states in a short time window (e.g., a few milliseconds, a second, a few seconds, etc.) in the future.

The environment detector 210 may also use sensor information 213 about the environment to determine and monitor the estimated goal of the collaborator's movement. For example, if the collaborator picks up an object, the goal of the collaborator's movement may be the location where the collaborator will likely deliver the object. Or, if an object is moving toward the collaborator on a conveyor belt, the estimated goal may be the time/location for when/where the collaborator reaches out to pickup the object from the conveyor. In this sense, the goal (g) may be a point in the workspace that the collaborator reaches toward, and in mathematical terms, defined as $g \in \mathbb{R}^3$. Goals may depend on the current task performed by the collaborator, and when the task is to collect, move, or deliver an object, the goal may depend on the locations of objects in the environment, exchange locations for the object, and the point in time of the task relative to other objects in the environment. The environment detector 210 may leverage a priori knowledge of potential goals defined by the known, closed universe of tasks that a collaborator and robot may perform at a given work location. For example, the environment detector 210 may detect and locate possible goals based on a predefined set of predefined tasks; the number, location, or existence of predefined objects that have been detected in the workspace; and/or the current kinematic state of the collaborator. The environment detector 210 may utilize any type of object detection algorithm that determines goals based on the location of objects within the environment, including algorithms such as MaskRCNN, PoseCNN, or DenseFusion.

In addition to determining a goal of the collaborator, the environment detector 210 may also use sensor information 213 about the environment, using a similar approach, to determine and monitor obstacles in the environment. The environment detector 210 may represent the location of obstacles in the environment using an occupancy map $c_o \in C$, where $c_o$ represents an occupied volume inside the total volume of the scene C (e.g., the environment or workspace), generated from the sensor information 213. As will be discussed in more detail below, occupancy information in the occupancy map $c_o$ may be used by the geometric planner 220 when generating trajectories so that they are collision-free trajectories.

The environment detector 210 may also use sensor information 213 about the environment to determine semantics about the objects in the environment and to generate semantic regions for the objects. The semantic regions $R_n$ may be understood as data-driven identifiers with preestablished value segments in the configuration space (e.g., the configuration space being the permitted/available kinematic states of the collaborator) that may be used to guide the geometric planner 220 when determining a path between the current position and the goal. To train the semantic dataset, the collaborator's movements may be observed by the environment detector 210 to detect the most common sets of kinematic states (e.g., joint configurations) that the collaborator performs. This set of most common kinematic states may create a region in the configuration space (e.g., the sampling space of the geometric planner 220) with a positive value. Conversely, the set of less common kinematic states may create a region in the configuration space with a negative value. The semantic values in each region may be taken into account by the geometric planner 220 to increase or decrease the cost of traversing a vertex segment (e.g., when plotting a path between a current state of the collaborator to the goal), so that cost of the paths generated by the geometric planner 220 is not only distance-based, but also based on the semantic costs along the generated paths. As should be appreciated, the semantic values associated with the semantic dataset may also include a weighting for the cost of transitioning the segment that depends on observable information about the objects and may be pre-determined by the prediction system 200 or user-defined. The semantic dataset and associated information may be stored (e.g., in memory) in a semantic database 215.

Additional details of the geometric planner 220 are discussed below. The geometric planner 220 may take as inputs the estimated goals, the previously observed and forecasted trajectories for the collaborator, and/or the semantic map of the workspace. The geometric planner 220 may use this received information to plot a path between a current state of the collaborator to the estimated goal(s) of the collaborator. To plot a path, the geometric planner 220 may use any number of algorithms such as a probabilistic roadmap (PRM) to plot a series of kinematic states of the collaborator from the current state to the estimated goal(s). As should be appreciated, any type of geometric methods may be used to plot the path, including, as examples, Rapidly-exploring Random Trees (RRT), Rapidly-exploring Random Graph (RRG), RRT-Connect, and Optimal RRT (RRT*). Using a PRM algorithm as an example, it may use a precomputed cost between edges in the graph (e.g., following a collision-free random set of kinematic states of the collaborator from the current state to the estimated goal(s) inside the given map), where the PRM algorithm may chose the closest collision-free edges using the formula $V_r=\{v \in V:\|q_r-v\| \le \gamma^*\}$, where v represents a vertex from the set of vertices V in the PRM graph, $q_r$ represents the collaborator's kinematic state (e.g., an arm configuration) of the sampled point, and $\gamma^*$ is the connection radius.

Then, the algorithm may compute the vertex cost for each vertex in $V_r$ as $$\|q_r - v\| + \sum_{n=0}^{N} \sigma_n \|q_{R_n}\|,$$

where the line segment $[q_e,v]$ may be split into N subsegments $q_{R_n}$ corresponding to different semantic regions, where $\|q_{R_n}\|$ is the length of each subsegment, and $\sigma_n \in \mathbb{R}$ is the weight associated with the region $R_n$. Thus, the geometric planner 220 may use this algorithm to connect the goal(s) of the collaborator to the current state of the collaborator.

Next, the geometric planner 220 may use a graph searching-based algorithm to find the paths (e.g., the k-best paths) that connect the current state of the collaborator to the estimated goal(s) of the collaborator. As noted earlier, this may use a cost-based analysis where the cost through regions of the workspace may include not only distance but also the sematic-based costs discussed above with respect to the semantic database 215. In addition, the geometric planner 220 may also take into account path limitations, not only based on obstacles that may lie between the current state and the estimated goal(s), but also in terms of expected kinematic states for the collaborator. For example, a human collaborator is likely to follow human-like trajectories, were the elbow points towards the floor, and these expectations may be built in to the preferences of the geometric planner 220 when building an expected trajectory.

The output of the geometric planner 220 may be a set of different expected trajectories/paths (H) that it has calculated and thus $H=\{\eta_1, \eta_2, \ldots, \eta_k\}$, where each q is a sequence of kinematic states of the collaborator from the currently observed kinematic state to a goal $g \in \mathbb{R}^3$. The set of different expected trajectories/paths (H) may be within the different homotopy classes for the various configuration paths that reach the desired goals. For this, the geometric planner 220 may use a k-shortest paths with limited overlap (kSPwLO)

algorithm that provides low overlap among the proposed output paths and favors diversity in the resulting homotopy classes.

More details of the short-horizon predictor 230 are discussed below. As mentioned earlier, the actual observations of the kinematic state of the collaborator may be extended past the current time in order to estimate observations for a short time in the future (e.g., for a short horizon). The short-horizon predictor 230 may predict the short-horizon window in real-time based on the already-observed kinematic states that were previously recorded. In this sense, the short-horizon predictor 230 may be an iterative algorithm, and thus as new observations are made (e.g., new observations by the environment detector 210) as time lapses, the short-horizon predictor 230 may update its estimate for the next time period. The short-horizon predictor 230 may utilize a dynamical model of the collaborator's motion (e.g., the motion of arms/limbs) based on a non-linear high-order nominal model (e.g., one that identifies the coefficients of the non-linear functions of the model through Kalman filters).

First, the short-horizon predictor 230 may define a nominal model through a set of observables $\psi(q_h,\dot{q}_h)$ of the possible kinetic states of the collaborator's movements (e.g., the detectable states of the arms/limbs of the collaborator), where these states are defined as the detected kinematic states $Q_h=[q_h,\dot{q}_h]^T\mathbb{R}^n$ (e.g., joint angles, joint velocities, etc. of the arms/limbs of the collaborator). The observables $\phi\in\mathbb{R}^m$, with m>n, of the system may be a high-order vector which contains linear and non-linear functions of the system states. Examples of such linear and non-linear functions may include polynomials, trigonometric functions, composition of functions, etc. One example of the observables may be given by the following equation:

$$\psi=\left[q_h,\, q_h^2,\, \dot{q}_h^3,\, \sin(q_h),\, q_h\cos(q_h),\, \dots\right]^T$$

From these observables, short-horizon predictor 230 may define the nominal non-linear dynamical system as $\dot{\hat{q}}_h=K\phi(\hat{q}_h,\dot{\hat{q}}_h)$, where $\hat{Q}_h=(\hat{q}_h,\dot{\hat{q}}_h)$, which are the estimated kinematic states of the collaborator's arms/limbs from the dynamical model and K is a rectangular matrix of coefficients which determines in a linear fashion how much each observable (either linear or nonlinear elements) contributes to each of the states of the system. Next, the short-horizon predictor 230 may identify the coefficients of the matrix K for the dynamical model. The short-horizon predictor 230 may perform this identification with an extended Kalman filter for each of the states of the system $[q_h,\dot{q}_h]^T\in\mathbb{R}^{2n}$, the goal of which is to let the following error terms approach zero:

$$e_{q_h}=q_h-\hat{q}_h\rightarrow 0$$

$$e_{\dot{q}_h}=\dot{q}_h-\dot{\hat{q}}_h\rightarrow 0$$

As such, the set of Kalman filters for each state may be given by:

$$K_i=K_i+\tau\left\{P_i\psi(q_h,\dot{q}_h)\frac{1}{R_i}\left(q_{h,i}-\hat{q}_{h,i}\right)\right\}$$

$$P_i=P_i+\tau\left\{Q_i-\frac{1}{R_i}P_i\psi(q_h,\dot{q}_h)\psi^T(q_h,\dot{q}_h)P_i\right\}$$

In the example equations above, $i\in\mathbb{R}^{2n}$ is the state of the system to which the extended Kalman filter is associated. The short-horizon predictor 230 may apply this in an iterative fashion as actually observed states of the system are newly detected, and thus, the non-linear dynamical system is able to approximate the behavior in a local manner at each point in time. As such, the short-horizon predictor 230 may use such a dynamical system to estimate the kinematic states of the collaborator for a short-time window and thus extend the original vector of an actually detected series of collaborator states of motion with a series of estimated collaborator states of such motion in the near-term horizon.

Figure 3A:
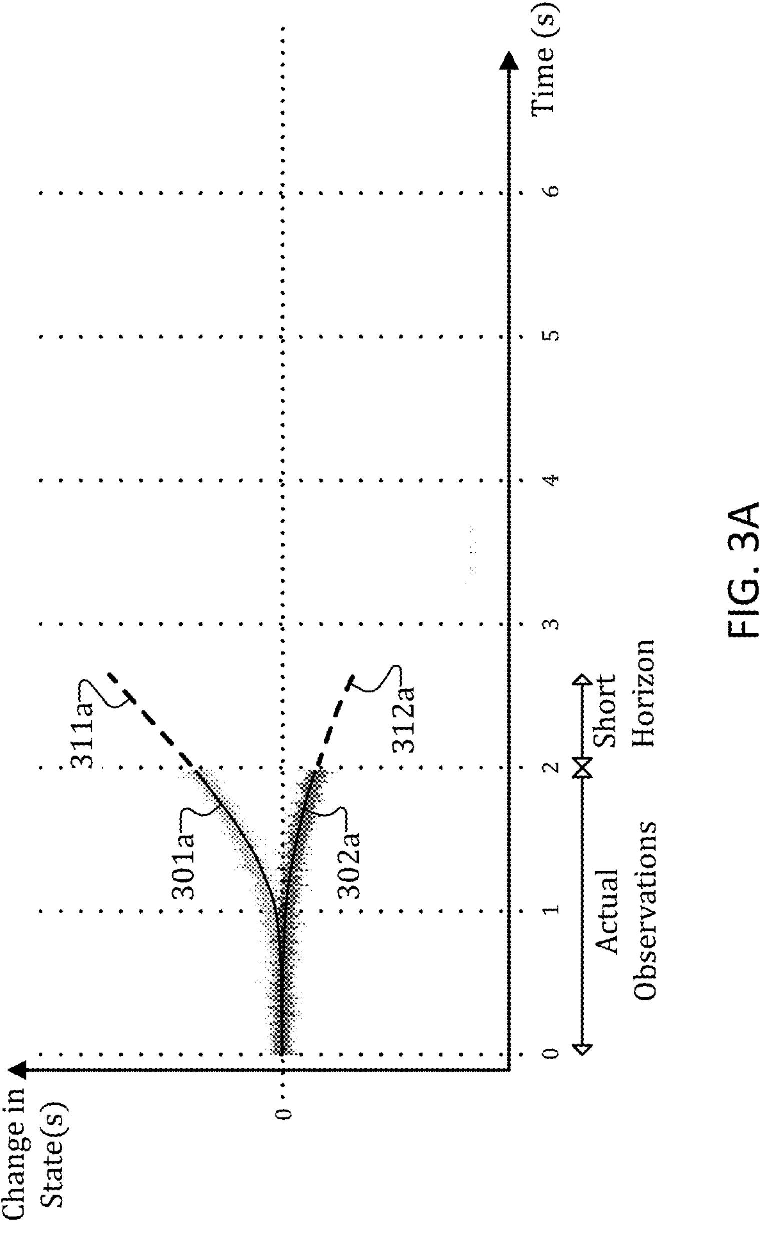
FIGS. 3A-3C depict exemplary plots of actual, estimated, and short-term trajectory states of a collaborator's arms/limbs over time.
Figure 3B:
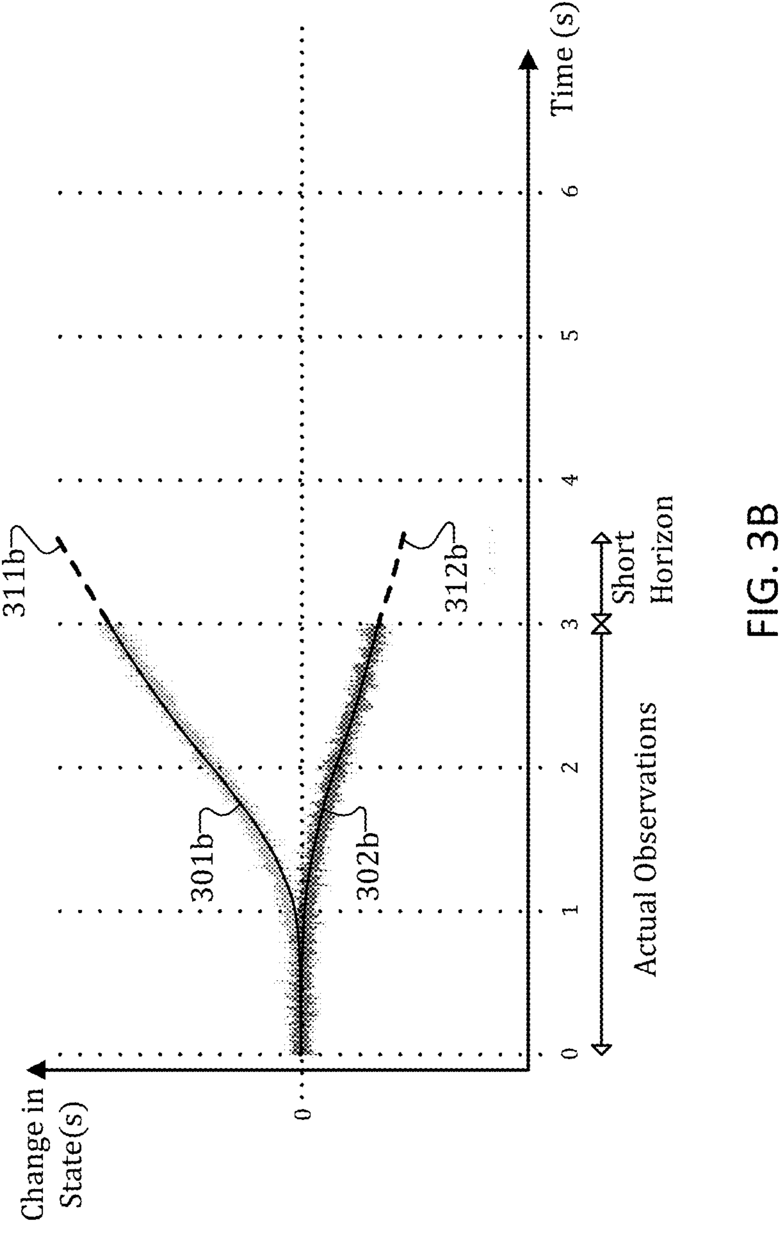
Figure 3C:
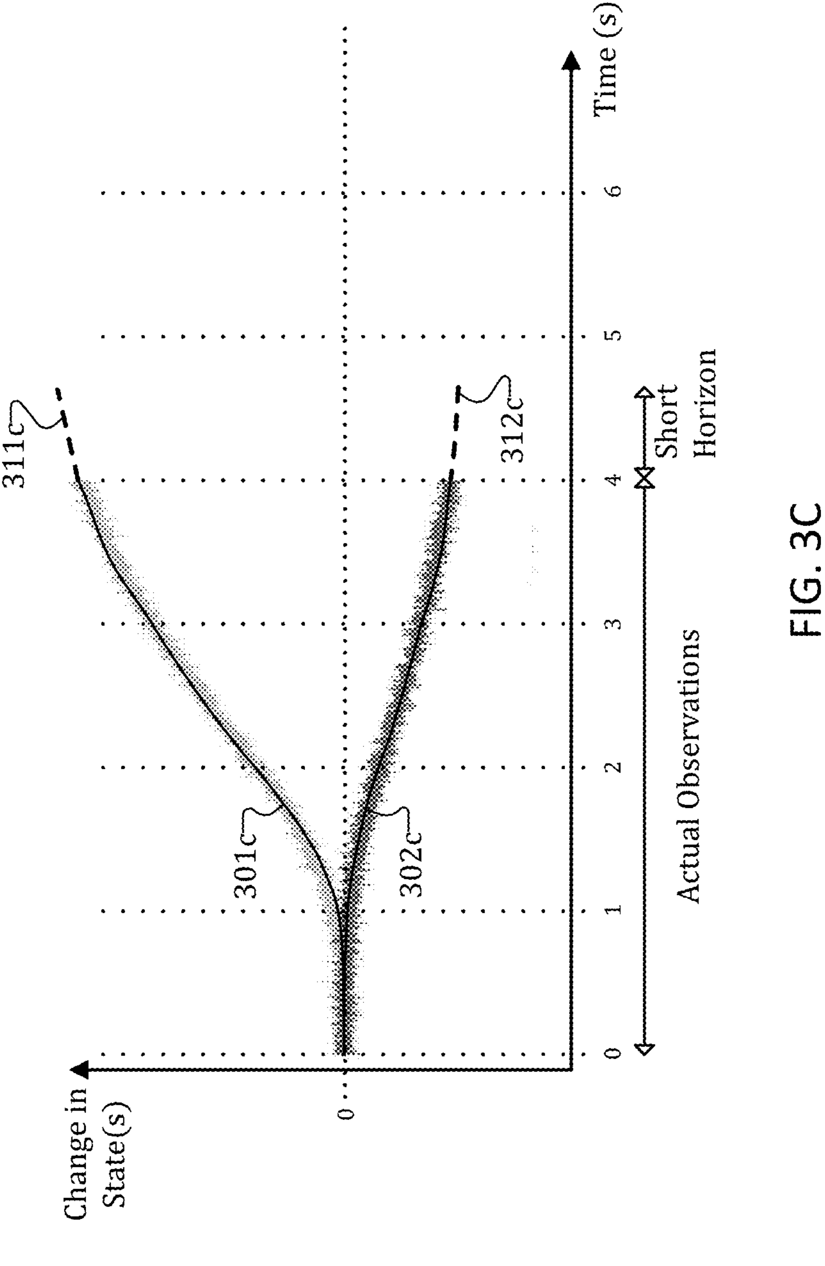

Some graphical examples of such identification and estimation (e.g., by the short-horizon predictor 230) are shown in FIGS. 3A-3C, where the previously-observed actual kinematic states are used to make a short-horizon prediction. In each of FIGS. 3A-3C, the change in kinematic state (y-axis) from a nominal state (zero) is plotted over time (x-axis). Two different joints are plotted, where one joint changes in the negative direction (below zero on the y-axis) and another joint changes in the positive direction (above zero on the y-axis), relative to their nominal states (zero on the y-axis). The solid lines 301*a*, 301*b*, 301*c* and solid lines 302*a*, 302*b*, 302*c* plot the actually observed states for each joint over time while the dashed lines 311*a*, 311*b*, 311*c* and dashed lines 312*a*, 312*b*, 312*c* represent the short-horizon predictions for each joint for a short time period in the future. The "noise" behind each solid line represents the "ground truth" of actual observations that the prediction system (e.g., prediction system 200) may have determined from sensor data as the observed states. Each figure represents a different snapshot in time at which the short-horizon predictor 230 estimates a predicted trajectory, where the window of actual historical observations that are available for use by the short-horizon predictor 230 grows larger over time.

In FIG. 3A, for example, the short-horizon predictor 230 determines for the time period from 2 to 2.7 seconds a short-horizon prediction 311*a* for a first joint and a short-horizon prediction 312*a* for a second joint. For the first joint, the short-horizon prediction 311*a* may be based on actual observations 301*a* from an earlier time period that, in FIG. 3A, is from time 0 to 2 seconds. Similarly, for the second joint, the short-horizon prediction 312*a* may be based on actual observations 302*a* from time 0 to 2 seconds. FIG. 3B shows a later time in the sequence that is one second later than FIG. 3A. In FIG. 3B, the short-horizon predictor 230 determines predictions for the time period from 3 to 3.7 seconds-a short-horizon prediction 311*b* for a first joint and a short-horizon prediction 312*b* for a second joint. For the first joint, the short-horizon prediction 311*b* may be based on actual observations 301*b* from an earlier time period that, in FIG. 3B, is from time 0 to 3 seconds. Similarly, for the second joint, the short-horizon prediction 312*b* may be based on actual observations 302*b* from time 0 to 3 seconds. FIG. 3C shows a time one second later than that of FIG. 3B. In FIG. 3C, the short-horizon predictor 230 determines predictions for the time period from 4 to 4.7 seconds-a short-horizon prediction 311*c* for a first joint and a short-horizon prediction 312*c* for a second joint. For the first joint, the short-horizon prediction 311*c* may be based on actual observations 301*c* from an earlier time period that, in FIG. 3C, is from time 0 to 4 seconds. Similarly, for the second joint, the short-horizon prediction 312*c* may be based on actual observations 302*c* from time 0 to 4 seconds.

Returning to FIG. 2, more details of the likelihood estimator 240 are discussed below. The likelihood estimator 240 may calculate, for each possible trajectory generated by the geometric planner 220, the probability that the trajectory will be the actual trajectory. The likelihood estimator 240 may determine the likelihood by evaluating a multivariate normal distribution centered on each trajectory point at each generated trajectory point. An example formula for such a determination is shown below:

$$\mathcal{L}(\hat{\tau}_{0:T+w})=\mathcal{N}(\tau_{0:T+w}\sigma|\hat{\tau}_{0:T+w})$$

In the above formula, $\hat{\tau}^{i}_{0:T+w}$ is the ith trajectory generated by the geometric planner 220 from the point in time the environment detector 210 detected the first motion of the collaborator (t=0) to the current time frame (t=T), which may be extended by the short-horizon predictor 230 over a short-term prediction window (w), as discussed above. The parameter σ may be understood as a confidence parameter that may be adjusted freely, depending on the desired precision and the desired diversity in the trajectories that have a high likelihood. In short, the likelihood estimator 240 may determine likelihood by comparing each of the generated trajectories with the observed trajectory that has been augmented by the short-horizon predictor 230. These likelihoods may then be transmitted to the robot's motion controller/planner, so that the robot may use the likelihoods when path planning and when controlling its movements in the collaboration environment.

Figure 4:
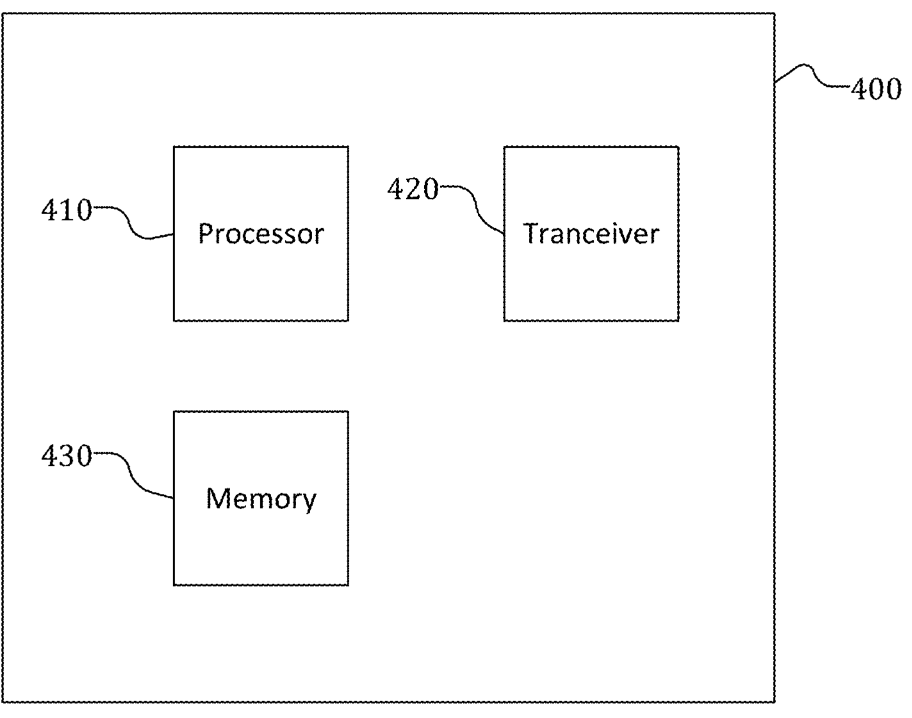
FIG. 4 illustrates an exemplary schematic drawing of a prediction system for predicting movements of a collaborator.

FIG. 4 is a schematic drawing illustrating a device 400 for making real-time determinations of likelihoods for possible trajectories of a collaborator in a workspace with a robot. The device 400 may include any of the features discussed above with respect to a prediction system (e.g., prediction system 200) and any of FIGS. 1-3. FIG. 4 may be implemented as a device, a system, a method, and/or a computer readable medium that, when executed, performs the features of the real-time prediction system described above. It should be understood that device 400 is only an example, and other configurations may be possible that include, for example, different components or additional components.

Device 400 includes a processor 410. In addition to or in combination with any of the features described in this or the following paragraphs, the processor 410 of device 400 is configured to determine a current kinematic state of a collaborator in a workspace shared with a robot. In addition to or in combination with any of the features described in this or the following paragraphs, processor 410 is also configured to determine a goal of the collaborator based on occupancy information about objects in the workspace. In addition to or in combination with any of the features described in this or the following paragraphs, processor 410 is also configured to determine a possible trajectory for the collaborator based on the goal and the current kinematic state. In addition to or in combination with any of the features described in this or the following paragraphs, processor 410 is also configured to determine a short-horizon trajectory for the collaborator based on previously observed kinematic states of the collaborator towards the goal. In addition to or in combination with any of the features described in this or the following paragraphs, processor 410 is also configured to determine a likelihood that the collaborator will follow the possible trajectory based on the short-horizon trajectory, the goal, and the current kinematic state. In addition to or in combination with any of the features described in this or the following paragraphs, processor 410 is also configured to generate a movement instruction to control movement of the robot based on the likelihood that the collaborator will follow the possible trajectory.

Furthermore, in addition to or in combination with any one of the features of this and/or the preceding paragraph, device 400 may further include a transmitter configured to transmit the movement instruction to the robot. Furthermore, in addition to or in combination with any one of the features of this and/or the preceding paragraph, device 400 may further include a transmitter (e.g., transceiver 420) configured to transmit the movement instruction to the robot. Furthermore, in addition to or in combination with any one of the features of this and/or the preceding paragraph, device 400 may further include a receiver (e.g., transceiver 420) configured to receive collaborator information about the current kinematic state of the collaborator in the workspace. Furthermore, in addition to or in combination with any one of the features of this and/or the preceding paragraph, device 400 may further include a receiver (e.g., transceiver 420) configured to receive occupancy information about the objects in the workspace. Furthermore, in addition to or in combination with any one of the features of this and/or the preceding paragraph with respect to device 400, the occupancy information may include at least one of a location of the object in the workspace, a volume of space occupied by the object in the workspace, and a movement trajectory of the object within the workspace.

Furthermore, in addition to or in combination with any one of the features of this and/or the preceding two paragraphs, processor 410 configured to determine the possible trajectory may include processor 410 configured to assign a semantic cost to a region of the workspace based on a historical database of kinematic states of collaborators in the workspace and based on a comparison of the current kinematic state to the historical database of kinematic states. Furthermore, in addition to or in combination with any one of the features of this and/or the preceding two paragraphs, processor 410 may be configured to determine the possible trajectory includes the processor configured to assign a semantic cost to a region of the workspace based on a historical database of object information and based on a comparison of the objects to the historical database of object information. Furthermore, in addition to or in combination with any one of the features of this and/or the preceding two paragraphs with respect to device 400, the object information may include at least one of a type of the objects, a position within the workspace of the objects, a size of the objects, a weight of the objects, and a shape of the objects. Furthermore, in addition to or in combination with any one of the features of this and/or the preceding two paragraphs, processor 410 may be configured to determine the possible trajectory includes the processor configured to generate a sequence of expected kinematic states between the current kinematic state and the estimate goal based on the semantic cost.

Furthermore, in addition to or in combination with any one of the features of this and/or the preceding three paragraphs, processor 410 configured to generate the sequence of expected kinematic positions may include processor 410 configured to generate the sequence of expected kinematic positions further based on a k-best paths algorithm between the current kinematic state and the estimated goal. Furthermore, in addition to or in combination with any one of the features of this and/or the preceding three paragraphs with respect to device 400, the current kinematic state may include at least one of a position of an arm segment of the collaborator in the workspace, a velocity of the arm segment, an acceleration of the arm segment, and a jerk of the arm segment. Furthermore, in addition to or in combination with any one of the features of this and/or the preceding three paragraphs, the possible trajectory may include a geometric path of the arm segment from the current kinematic state to the expected goal.

Furthermore, in addition to or in combination with any one of the features of this and/or the preceding four paragraphs, the possible trajectory may be based on a path cost associated with the geometric path. Furthermore, in addition to or in combination with any one of the features of this and/or the preceding four paragraphs, the path cost may be based on distances of subsegments along the geometric path. Furthermore, in addition to or in combination with any one of the features of this and/or the preceding four paragraphs, the path cost is based on a semantic cost associated with each corresponding region traversed by each subsegment of the subsegments along the geometric path. Furthermore, in addition to or in combination with any one of the features of this and/or the preceding four paragraphs, the geometric path may be based on a set of collision free paths defined by human-like movements of the arm segment (e.g., elbow points to the floor, maximum rotations relative to other arm segments, etc.).

Furthermore, in addition to or in combination with any one of the features of this and/or the preceding five paragraphs, the collaborator may include a human. Furthermore, in addition to or in combination with any one of the features of this and/or the preceding five paragraphs, the collaborator may include another robot. Furthermore, in addition to or in combination with any one of the features of this and/or the preceding five paragraphs, processor 410 configured to determine the short-horizon trajectory may include processor 410 configured to model a next kinematic state of the collaborator at a next time interval based on a matrix of coefficients that define how much each of the previously observed kinematic states contributes to the next kinematic state. Furthermore, in addition to or in combination with any one of the features of this and/or the preceding five paragraphs, processor 410 configured to determine the likelihood may include processor 410 configured to evaluate a multivariate normal distribution centered on each trajectory point of the possible trajectory. Furthermore, in addition to or in combination with any one of the features of this and/or the preceding five paragraphs, the current kinematic state may be associated with a current time and the previously observed kinematic states are associated with previous times before the current time.

Furthermore, in addition to or in combination with any one of the features of this and/or the preceding six paragraphs, processor 410 may be further configured to iteratively redetermine the likelihood at a time interval, to redetermine the current kinematic state at each time interval, to redetermine the estimated goal at each time interval, to redetermine the possible trajectory at each time interval, and to redetermine the short-horizon trajectory at each time interval. Furthermore, in addition to or in combination with any one of the features of this and/or the preceding six paragraphs, device 400 may further include a memory 430 configured to store at least one of the movement instruction, the current kinematic state, the estimated goal, the occupancy information, the possible trajectory, the current kinematic state, the short-horizon trajectory, the previously observed kinematic states, and the likelihood.

Figure 5:
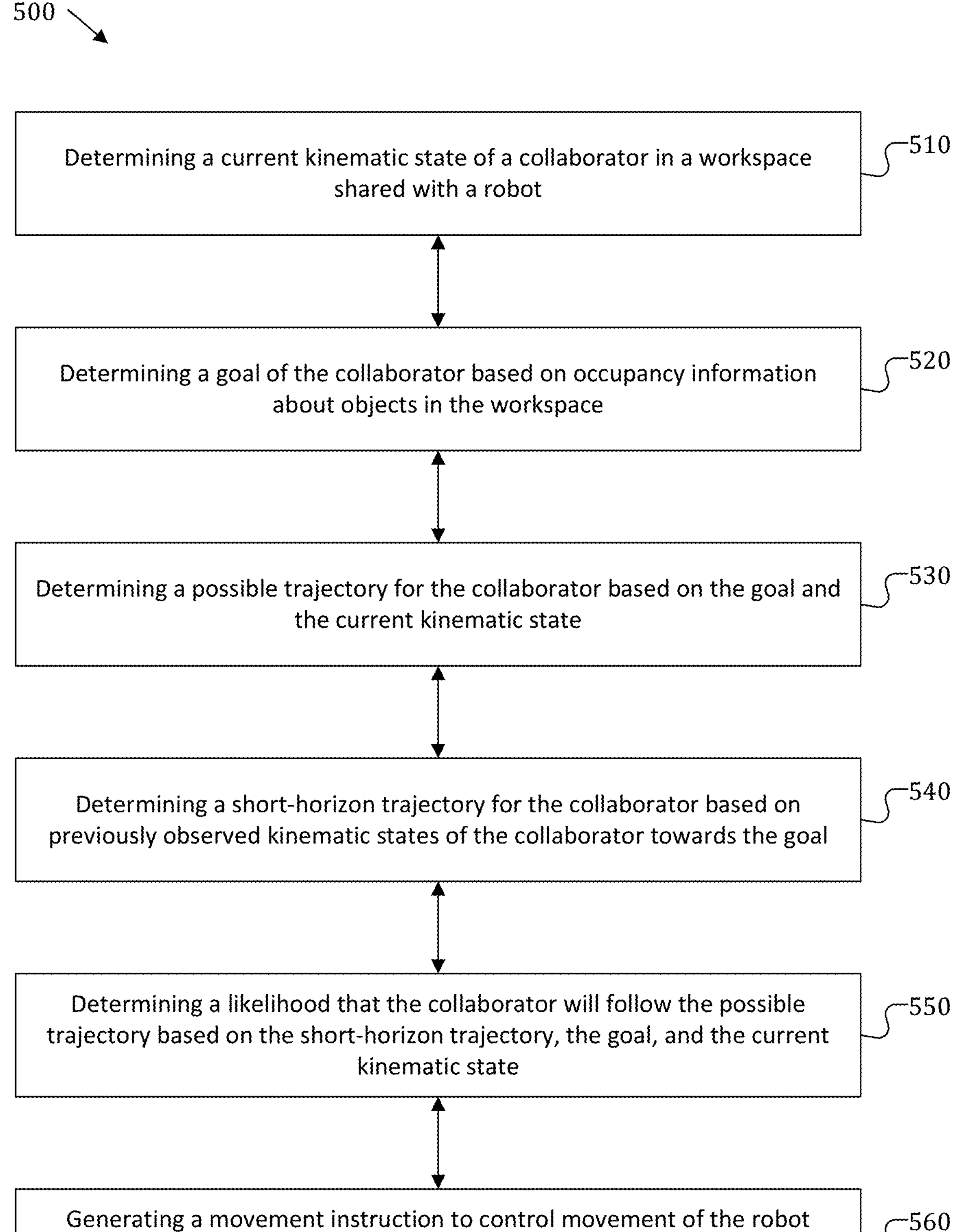
FIG. 5 depicts an exemplary schematic flow diagram of a method for predicting movements of a collaborator.

FIG. 5 depicts a schematic flow diagram of a method 500 for making real-time determinations of likelihoods for possible trajectories of a collaborator in a workspace with a robot. Method 500 may implement any features discussed above with respect to a prediction system (e.g., prediction system 200 and/or device 400) and any of FIGS. 1-4.

Method 500 includes, in 510, determining a current kinematic state of a collaborator in a workspace shared with a robot. The method 500 also includes, in 520, determining a goal of the collaborator based on occupancy information about objects in the workspace. The method 500 also includes, in 530, determining a possible trajectory for the collaborator based on the goal and the current kinematic state. The method 500 also includes, in 540, determining a short-horizon trajectory for the collaborator based on previously observed kinematic states of the collaborator towards the goal. The method 500 also includes, in 550, determining a likelihood that the collaborator will follow the possible trajectory based on the short-horizon trajectory, the goal, and the current kinematic state. The method 500 also includes, in 560, generating a movement instruction to control movement of the robot based on the likelihood that the collaborator will follow the possible trajectory.

In the following, various examples are provided that may include one or more aspects described above with reference to a prediction system (e.g., prediction system 200 and/or device 400 and any of FIGS. 1-4) for making real-time determinations of likelihoods for possible trajectories of a collaborator in a workspace with a robot. The examples provided in relation to the devices may apply also to the described method(s), and vice versa.

Example 1 is a device including a processor configured to determine a current kinematic state of a collaborator in a workspace shared with a robot. The processor is also configured to determine a goal of the collaborator based on occupancy information about objects in the workspace. The processor is also configured to determine a possible trajectory for the collaborator based on the goal and the current kinematic state. The processor is also configured to determine a short-horizon trajectory for the collaborator based on previously observed kinematic states of the collaborator towards the goal. The processor is also configured to determine a likelihood that the collaborator will follow the possible trajectory based on the short-horizon trajectory, the goal, and the current kinematic state. The processor is also configured to generate a movement instruction to control movement of the robot based on the likelihood that the collaborator will follow the possible trajectory.

Example 2 is the device of example 1, the device further including a transmitter configured to transmit the movement instruction to the robot.

Example 3 is the device of example 1 or 2, the device further including a receiver configured to receive collaborator information about the current kinematic state of the collaborator in the workspace.

Example 4 is the device of any one of examples 1 to 3, the device further including a receiver configured to receive occupancy information about the objects in the workspace.

Example 5 is the device of any one of examples 1 to 4, wherein the occupancy information includes at least one of a location of the object in the workspace, a volume of space occupied by the object in the workspace, and a movement trajectory of the object within the workspace.

Example 6 is the device of any one of examples 1 to 5, wherein the processor configured to determine the possible trajectory includes the processor configured to assign a semantic cost to a region of the workspace based on a historical database of kinematic states of collaborators in the workspace and based on a comparison of the current kinematic state to the historical database of kinematic states.

Example 7 is the device of any one of examples 1 to 6, wherein the processor configured to determine the possible trajectory includes the processor configured to assign a semantic cost to a region of the workspace based on a historical database of object information and based on a comparison of the objects to the historical database of object information.

Example 8 is the device of example 7, wherein the object information includes at least one of a type of the objects, a position within the workspace of the objects, a size of the objects, a weight of the objects, and a shape of the objects.

Example 9 is the device of any one of examples 1 to 8, wherein the processor configured to determine the possible trajectory includes the processor configured to generate a sequence of expected kinematic states between the current kinematic state and the estimate goal based on the semantic cost.

Example 10 is the device of example 9, wherein the processor configured to generate the sequence of expected kinematic positions includes the processor configured to generate the sequence of expected kinematic positions further based on a k-best paths algorithm between the current kinematic state and the estimated goal.

Example 11 is the device of any one of examples 1 to 10, wherein the current kinematic state includes at least one of a position of an arm segment of the collaborator in the workspace, a velocity of the arm segment, an acceleration of the arm segment, and a jerk of the arm segment.

Example 12 is the device of example 11, wherein the possible trajectory includes a geometric path of the arm segment from the current kinematic state to the expected goal.

Example 13 is the device of example 12, wherein the possible trajectory is based on a path cost associated with the geometric path.

Example 14 is the device of example 13, wherein the path cost is based on distances of subsegments along the geometric path.

Example 15 is the device of example 14, wherein the path cost is based on a semantic cost associated with each corresponding region traversed by each subsegment of the subsegments along the geometric path.

Example 16 is the device of any one of examples 12 to 15, wherein the geometric path is based on a set of collision free paths defined by human-like movements of the arm segment (e.g., elbow points to the floor, maximum rotations relative to other arm segments, etc.).

Example 17 is the device of any one of examples 1 to 16, wherein the collaborator includes a human.

Example 18 is the device of any one of examples 1 to 17, wherein the collaborator includes another robot.

Example 19 is the device of any one of examples 1 to 18, wherein the processor configured to determine the short-horizon trajectory includes the processor configured to model a next kinematic state of the collaborator at a next time interval based on a matrix of coefficients that define how much each of the previously observed kinematic states contributes to the next kinematic state.

Example 20 is the device of any one of examples 1 to 19, wherein the processor configured to determine the likelihood includes the processor configured to evaluate a multivariate normal distribution centered on each trajectory point of the possible trajectory.

Example 21 is the device of example 20, wherein the current kinematic state is associated with a current time and the previously observed kinematic states are associated with previous times before the current time.

Example 22 is the device of any one of examples 1 to 21, wherein the processor is further configured to iteratively redetermine the likelihood at a time interval, wherein the processor is configured to redetermine the current kinematic state at each time interval, redetermine the estimated goal at each time interval, redetermine the possible trajectory at each time interval, and redetermine the short-horizon trajectory at each time interval.

Example 23 is the device of any one of examples 1 to 22, further including a memory configured to store at least one of the movement instruction, the current kinematic state, the estimated goal, the occupancy information, the possible trajectory, the current kinematic state, the short-horizon trajectory, the previously observed kinematic states, and the likelihood.

Example 24 is an apparatus for predicting arm movements of a human collaborating with a robot in a collaboration workspace. The apparatus includes an observation circuit configured to determine a current kinematic state of the human, determine occupancy information about objects in the collaboration workspace, and determine a goal of the human based on the occupancy information and the current kinematic state. The apparatus also includes a geometric planner circuit configured to determine a possible trajectory for the human based on the goal and the current kinematic state. The apparatus also includes a short-horizon circuit configured to determine a short-horizon trajectory for the human based on previously observed kinematic states of the human towards the goal. The apparatus also includes a controller circuit configured to determine a likelihood that the human will follow the possible trajectory, wherein the likelihood is based on the short-horizon trajectory, the goal, and the current kinematic state. The controller circuit is also configured to generate a movement instruction to control movement of the robot based on the likelihood.

Example 25 is the apparatus of example 24, the apparatus further including a transmitter configured to transmit the movement instruction to the robot.

Example 26 is the apparatus of example 24 or 25, the apparatus further including a receiver configured to receive collaborator information about the current kinematic state of the collaborator in the workspace.

Example 27 is the apparatus of any one of examples 24 to 26, the apparatus further including a receiver configured to receive occupancy information about the objects in the workspace.

Example 28 is the apparatus of any one of examples 24 to 27, wherein the occupancy information includes at least one of a location of the object in the workspace, a volume of space occupied by the object in the workspace, and a movement trajectory of the object within the workspace.

Example 29 is the apparatus of any one of examples 24 to 28, wherein the geometric planner circuit configured to includes the geometric planner circuit configured to assign a semantic cost to a region of the workspace based on a historical database of kinematic states of collaborators in the workspace and based on a comparison of the current kinematic state to the historical database of kinematic states.

Example 30 is the apparatus of any one of examples 24 to 29, wherein the geometric planner circuit configured to determine the possible trajectory includes the geometric planner circuit configured to assign a semantic cost to a region of the workspace based on a historical database of object information and based on a comparison of the objects to the historical database of object information.

Example 31 is the apparatus of example 30, wherein the object information includes at least one of a type of the objects, a position within the workspace of the objects, a size of the objects, a weight of the objects, and a shape of the objects.

Example 32 is the apparatus of any one of examples 24 to 31, wherein the geometric planner circuit configured to determine the possible trajectory includes the geometric planner circuit configured to generate a sequence of expected kinematic states between the current kinematic state and the estimate goal based on the semantic cost.

Example 33 is the apparatus of example 32, wherein the geometric planner circuit configured to generate the sequence of expected kinematic positions includes the geometric planner circuit configured to generate the sequence of expected kinematic positions further based on a k-best paths algorithm between the current kinematic state and the estimated goal.

Example 34 is the apparatus of any one of examples 24 to 33, wherein the current kinematic state includes at least one of a position of an arm segment of the collaborator in the workspace, a velocity of the arm segment, an acceleration of the arm segment, and a jerk of the arm segment.

Example 35 is the apparatus of example 34, wherein the possible trajectory includes a geometric path of the arm segment from the current kinematic state to the expected goal.

Example 36 is the apparatus of example 35, wherein the possible trajectory is based on a path cost associated with the geometric path.

Example 37 is the apparatus of example 36, wherein the path cost is based on distances of subsegments along the geometric path.

Example 38 is the apparatus of example 37, wherein the path cost is based on a semantic cost associated with each corresponding region traversed by each subsegment of the subsegments along the geometric path.

Example 39 is the apparatus of any one of examples 35 to 38, wherein the geometric path is based on a set of collision free paths defined by human-like movements of the arm segment (e.g., elbow points to the floor, maximum rotations relative to other arm segments, etc.).

Example 40 is the apparatus of any one of examples 24 to 39, wherein the collaborator includes a human.

Example 41 is the apparatus of any one of examples 24 to 40, wherein the collaborator includes another robot.

Example 42 is the apparatus of any one of examples 24 to 41, wherein the short-horizon circuit configured to determine the short-horizon trajectory includes the short-horizon circuit configured to model a next kinematic state of the collaborator at a next time interval based on a matrix of coefficients that define how much each of the previously observed kinematic states contributes to the next kinematic state.

Example 43 is the apparatus of any one of examples 24 to 42, wherein the controller circuit configured to determine the likelihood includes the controller circuit configured to evaluate a multivariate normal distribution centered on each trajectory point of the possible trajectory.

Example 44 is the apparatus of example 43, wherein the current kinematic state is associated with a current time and the previously observed kinematic states are associated with previous times before the current time.

Example 45 is the apparatus of any one of examples 24 to 44, wherein the controller circuit is further configured to iteratively redetermine the likelihood at a time interval, wherein the observation circuit is configured to redetermine the current kinematic state at each time interval and redetermine the estimated goal at each time interval. The geometric planner is also configured to redetermine the possible trajectory at each time interval. The short-horizon circuit is also configured to redetermine the short-horizon trajectory at each time interval.

Example 46 is the apparatus of any one of examples 24 to 45, further including a memory configured to store at least one of the movement instruction, the current kinematic state, the estimated goal, the occupancy information, the possible trajectory, the current kinematic state, the short-horizon trajectory, the previously observed kinematic states, and the likelihood.

Example 47 is a method including determining a current kinematic state of a collaborator in a workspace shared with a robot. The method also includes determining a goal of the collaborator based on occupancy information about objects in the workspace. The method also includes determining a possible trajectory for the collaborator based on the goal and the current kinematic state. The method also includes determining a short-horizon trajectory for the collaborator based on previously observed kinematic states of the collaborator towards the goal. The method also includes determining a likelihood that the collaborator will follow the possible trajectory based on the short-horizon trajectory, the goal, and the current kinematic state. The method also includes generating a movement instruction to control movement of the robot based on the likelihood that the collaborator will follow the possible trajectory.

Example 48 is the method of example 47, the method further includes transmitting (e.g. via a transmitter) the movement instruction to the robot.

Example 49 is the method of example 47 or 48, the method further includes receiving (e.g., via a receiver) collaborator information about the current kinematic state of the collaborator in the workspace.

Example 50 is the method of any one of examples 47 to 49, the method further includes receiving (e.g. via a receiver) occupancy information about the objects in the workspace.

Example 51 is the method of any one of examples 47 to 50, wherein the occupancy information includes at least one of a location of the object in the workspace, a volume of space occupied by the object in the workspace, and a movement trajectory of the object within the workspace.

Example 52 is the method of any one of examples 47 to 51, wherein determining the possible trajectory includes assigning a semantic cost to a region of the workspace based on a historical database of kinematic states of collaborators in the workspace and based on a comparison of the current kinematic state to the historical database of kinematic states.

Example 53 is the method of any one of examples 47 to 52, wherein determining the possible trajectory includes assigning a semantic cost to a region of the workspace based on a historical database of object information and based on a comparison of the objects to the historical database of object information.

Example 54 is the method of example 53, wherein the object information includes at least one of a type of the objects, a position within the workspace of the objects, a size of the objects, a weight of the objects, and a shape of the objects.

Example 55 is the method of any one of examples 47 to 54, wherein determining the possible trajectory includes generating a sequence of expected kinematic states between the current kinematic state and the estimate goal based on the semantic cost.

Example 56 is the method of example 55, wherein generating the sequence of expected kinematic positions includes generating the sequence of expected kinematic positions further based on a k-best paths algorithm between the current kinematic state and the estimated goal.

Example 57 is the method of any one of examples 47 to 56, wherein the current kinematic state includes at least one of a position of an arm segment of the collaborator in the workspace, a velocity of the arm segment, an acceleration of the arm segment, and a jerk of the arm segment.

Example 58 is the method of example 57, wherein the possible trajectory includes a geometric path of the arm segment from the current kinematic state to the expected goal.

Example 59 is the method of example 58, wherein the possible trajectory is based on a path cost associated with the geometric path.

Example 60 is the method of example 59, wherein the path cost is based on distances of subsegments along the geometric path.

Example 61 is the method of example 60, wherein the path cost is based on a semantic cost associated with each corresponding region traversed by each subsegment of the subsegments along the geometric path.

Example 62 is the method of any one of examples 58 to 61, wherein the geometric path is based on a set of collision free paths defined by human-like movements of the arm segment (e.g., elbow points to the floor, maximum rotations relative to other arm segments, etc.).

Example 63 is the method of any one of examples 47 to 62, wherein the collaborator includes a human.

Example 64 is the method of any one of examples 47 to 63, wherein the collaborator includes another robot.

Example 65 is the method of any one of examples 47 to 64, wherein the determining the short-horizon trajectory includes modeling a next kinematic state of the collaborator at a next time interval based on a matrix of coefficients that define how much each of the previously observed kinematic states contributes to the next kinematic state.

Example 66 is the method of any one of examples 47 to 65, wherein determining the likelihood includes evaluating a multivariate normal distribution centered on each trajectory point of the possible trajectory.

Example 67 is the method of example 66, wherein the current kinematic state is associated with a current time and the previously observed kinematic states are associated with previous times before the current time.

Example 68 is the method of any one of examples 47 to 67, wherein the method further includes iteratively redetermining the likelihood at a time interval, redetermining the current kinematic state at each time interval, redetermining the estimated goal at each time interval, redetermining the possible trajectory at each time interval, and redetermining the short-horizon trajectory at each time interval.

Example 69 is the method of any one of examples 47 to 68, the method further including storing (e.g., in a memory) at least one of the movement instruction, the current kinematic state, the estimated goal, the occupancy information, the possible trajectory, the current kinematic state, the short-horizon trajectory, the previously observed kinematic states, and the likelihood.

Example 70 is a device including a means for determining a current kinematic state of a collaborator in a workspace shared with a robot. The device also includes a means for determining a goal of the collaborator based on occupancy information about objects in the workspace. The device also includes a means for determining a possible trajectory for the collaborator based on the goal and the current kinematic state. The device also includes a means for determining a short-horizon trajectory for the collaborator based on previously observed kinematic states of the collaborator towards the goal. The device also includes a means for determining a likelihood that the collaborator will follow the possible trajectory based on the short-horizon trajectory, the goal, and the current kinematic state. The device also includes a means for generating a movement instruction to control movement of the robot based on the likelihood that the collaborator will follow the possible trajectory.

Example 71 is the device of example 70, the device further including a means for transmitting the movement instruction to the robot.

Example 72 is the device of example 70 or 71, the device further including a means for receiving collaborator information about the current kinematic state of the collaborator in the workspace.

Example 73 is the device of any one of examples 70 to 72, the device further including a means for receiving occupancy information about the objects in the workspace.

Example 74 is the device of any one of examples 70 to 73, wherein the occupancy information includes at least one of a location of the object in the workspace, a volume of space occupied by the object in the workspace, and a movement trajectory of the object within the workspace.

Example 75 is the device of any one of examples 70 to 74, wherein the means for determining the possible trajectory includes a means for assigning a semantic cost to a region of the workspace based on a historical database of kinematic states of collaborators in the workspace and based on a comparison of the current kinematic state to the historical database of kinematic states.

Example 76 is the device of any one of examples 70 to 75, wherein the means for determining the possible trajectory includes a means for assigning a semantic cost to a region of the workspace based on a historical database of object information and based on a comparison of the objects to the historical database of object information.

Example 77 is the device of example 76, wherein the object information includes at least one of a type of the objects, a position within the workspace of the objects, a size of the objects, a weight of the objects, and a shape of the objects.

Example 78 is the device of any one of examples 70 to 77, wherein the means for determining the possible trajectory includes a means for generating a sequence of expected kinematic states between the current kinematic state and the estimate goal based on the semantic cost.

Example 79 is the device of example 78, wherein the means for generating the sequence of expected kinematic positions includes the a means for generating the sequence of expected kinematic positions further based on a k-best paths algorithm between the current kinematic state and the estimated goal.

Example 80 is the device of any one of examples 70 to 79, wherein the current kinematic state includes at least one of a position of an arm segment of the collaborator in the workspace, a velocity of the arm segment, an acceleration of the arm segment, and a jerk of the arm segment.

Example 81 is the device of example 80, wherein the possible trajectory includes a geometric path of the arm segment from the current kinematic state to the expected goal.

Example 82 is the device of example 81, wherein the possible trajectory is based on a path cost associated with the geometric path.

Example 83 is the device of example 82, wherein the path cost is based on distances of subsegments along the geometric path.

Example 84 is the device of example 83, wherein the path cost is based on a semantic cost associated with each corresponding region traversed by each subsegment of the subsegments along the geometric path.

Example 85 is the device of any one of examples 81 to 84, wherein the geometric path is based on a set of collision free paths defined by human-like movements of the arm segment (e.g., elbow points to the floor, maximum rotations relative to other arm segments, etc.).

Example 86 is the device of any one of examples 70 to 85, wherein the collaborator includes a human.

Example 87 is the device of any one of examples 70 to 86, wherein the collaborator includes another robot.

Example 88 is the device of any one of examples 70 to 87, wherein the means for determining the short-horizon trajectory includes the a means for modelling a next kinematic state of the collaborator at a next time interval based on a matrix of coefficients that define how much each of the previously observed kinematic states contributes to the next kinematic state.

Example 89 is the device of any one of examples 70 to 88, wherein the means for determining the likelihood includes a means for evaluating a multivariate normal distribution centered on each trajectory point of the possible trajectory.

Example 90 is the device of example 89, wherein the current kinematic state is associated with a current time and the previously observed kinematic states are associated with previous times before the current time.

Example 91 is the device of any one of examples 70 to 90, the device further including a means for iteratively redetermining the likelihood at a time interval, a means for redetermining the current kinematic state at each time interval, a means for redetermining the estimated goal at each time interval, a means for redetermining the possible trajectory at each time interval, and a means for redetermining the short-horizon trajectory at each time interval.

Example 92 is the device of any one of examples 70 to 91, further including a means for storing at least one of the movement instruction, the current kinematic state, the estimated goal, the occupancy information, the possible trajectory, the current kinematic state, the short-horizon trajectory, the previously observed kinematic states, and the likelihood.

Example 93 is a non-transitory computer readable medium, including instructions which, if executed, cause one or more processors to determine a current kinematic state of a collaborator in a workspace shared with a robot. The instructions also cause the processor to determine a goal of the collaborator based on occupancy information about objects in the workspace. The instructions also cause the processor to determine a possible trajectory for the collaborator based on the goal and the current kinematic state. The instructions also cause the processor to determine a short-horizon trajectory for the collaborator based on previously observed kinematic states of the collaborator towards the goal. The instructions also cause the processor to determine a likelihood that the collaborator will follow the possible trajectory based on the short-horizon trajectory, the goal, and the current kinematic state. The instructions also cause the processor to generate a movement instruction to control movement of the robot based on the likelihood that the collaborator will follow the possible trajectory.

Example 94 is the non-transitory computer readable medium of example 93, wherein the instructions further cause the processor to transmit (e.g., via a transmitter) the movement instruction to the robot.

Example 95 is the non-transitory computer readable medium of example 93 or 94, wherein the instructions further cause the processor to receive (e.g., via a receiver) collaborator information about the current kinematic state of the collaborator in the workspace.

Example 96 is the non-transitory computer readable medium of any one of examples 93 to 95, wherein the instructions further cause a processor to receive (e.g., via a receiver) occupancy information about the objects in the workspace.

Example 97 is the non-transitory computer readable medium of any one of examples 93 to 96, wherein the occupancy information includes at least one of a location of the object in the workspace, a volume of space occupied by the object in the workspace, and a movement trajectory of the object within the workspace.

Example 98 is the non-transitory computer readable medium of any one of examples 93 to 97, wherein the instructions further cause the processor to determine the possible trajectory includes the processor configured to assign a semantic cost to a region of the workspace based on a historical database of kinematic states of collaborators in the workspace and based on a comparison of the current kinematic state to the historical database of kinematic states.

Example 99 is the non-transitory computer readable medium of any one of examples 93 to 98, wherein the instructions configured to cause the processor to determine the possible trajectory includes the instructions configured to cause the processor to assign a semantic cost to a region of the workspace based on a historical database of object information and based on a comparison of the objects to the historical database of object information.

Example 100 is the non-transitory computer readable medium of example 99, wherein the object information includes at least one of a type of the objects, a position within the workspace of the objects, a size of the objects, a weight of the objects, and a shape of the objects.

Example 101 is the non-transitory computer readable medium of any one of examples 93 to 100, wherein the instructions configured to cause the processor to determine the possible trajectory includes the instruction configured to cause the processor to generate a sequence of expected kinematic states between the current kinematic state and the estimate goal based on the semantic cost.

Example 102 is the non-transitory computer readable medium of example 101, wherein the instructions configured to cause the processor to generate the sequence of expected kinematic positions includes the instructions configured to cause the processor to generate the sequence of expected kinematic positions further based on a k-best paths algorithm between the current kinematic state and the estimated goal.

Example 103 is the non-transitory computer readable medium of any one of examples 93 to 102, wherein the current kinematic state includes at least one of a position of an arm segment of the collaborator in the workspace, a velocity of the arm segment, an acceleration of the arm segment, and a jerk of the arm segment.

Example 104 is the non-transitory computer readable medium of example 103, wherein the possible trajectory includes a geometric path of the arm segment from the current kinematic state to the expected goal.

Example 105 is the non-transitory computer readable medium of example 104, wherein the possible trajectory is based on a path cost associated with the geometric path.

Example 106 is the non-transitory computer readable medium of example 105, wherein the path cost is based on distances of subsegments along the geometric path.

Example 107 is the non-transitory computer readable medium of example 106, wherein the path cost is based on a semantic cost associated with each corresponding region traversed by each subsegment of the subsegments along the geometric path.

Example 108 is the non-transitory computer readable medium of any one of examples 104 to 107, wherein the geometric path is based on a set of collision free paths defined by human-like movements of the arm segment (e.g., elbow points to the floor, maximum rotations relative to other arm segments, etc.).

Example 109 is the non-transitory computer readable medium of any one of examples 93 to 108, wherein the collaborator includes a human.

Example 110 is the non-transitory computer readable medium of any one of examples 93 to 109, wherein the collaborator includes another robot.

Example 111 is the non-transitory computer readable medium of any one of examples 93 to 110, wherein the instructions configured to cause the processor to determine the short-horizon trajectory includes the instructions configured to cause the processor to model a next kinematic state of the collaborator at a next time interval based on a matrix of coefficients that define how much each of the previously observed kinematic states contributes to the next kinematic state.

Example 112 is the non-transitory computer readable medium of any one of examples 93 to 111, wherein the instructions configured to cause the processor to determine the likelihood includes the instructions configured to cause the processor to evaluate a multivariate normal distribution centered on each trajectory point of the possible trajectory.

Example 113 is the non-transitory computer readable medium of example 112, wherein the current kinematic state is associated with a current time and the previously observed kinematic states are associated with previous times before the current time.

Example 114 is the non-transitory computer readable medium of any one of examples 93 to 113, wherein the instructions are further configured to cause the processor to iteratively redetermine the likelihood at a time interval, wherein the instructions are further configured to cause the processor to redetermine the current kinematic state at each time interval, redetermine the estimated goal at each time interval, to redetermine the possible trajectory at each time interval, and to redetermine the short-horizon trajectory at each time interval.

Example 115 is the non-transitory computer readable medium of any one of examples 93 to 114, wherein the instructions are further configured to cause the processor to store (e.g., via a memory) at least one of the movement instruction, the current kinematic state, the estimated goal, the occupancy information, the possible trajectory, the current kinematic state, the short-horizon trajectory, the previously observed kinematic states, and the likelihood.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A device comprising a processor configured to:
- determine a current kinematic state of a collaborator in a workspace shared with a robot;
- determine a goal of the collaborator based on occupancy information about objects in the workspace;
- generate a sequence of expected kinematic positions based on a k-best paths algorithm between the current kinematic state and the goal;
- determine a possible trajectory for the collaborator based on the goal, the current kinematic state, and the sequence of expected kinematic positions;
- determine a short-horizon trajectory for the collaborator based on previously observed kinematic states of the collaborator towards the goal;
- determine a likelihood that the collaborator will follow the possible trajectory based on the short-horizon trajectory, the goal, and the current kinematic state; and
- generate a movement instruction to control movement of the robot based on the likelihood that the collaborator will follow the possible trajectory.

2. The device of claim 1, the device further comprising a transmitter configured to transmit the movement instruction to the robot.

3. The device of claim 1, the device further comprising a receiver configured to receive collaborator information about the current kinematic state of the collaborator in the workspace or to receive occupancy information about the objects in the workspace.

4. The device of claim 1, wherein the occupancy information comprises at least one of a location of the object in the workspace, a volume of space occupied by the object in the workspace, and a movement trajectory of the object within the workspace.

5. The device of claim 1, wherein the processor configured to determine the possible trajectory comprises the processor configured to assign a semantic cost to a region of the workspace based on a historical database of kinematic states of collaborators in the workspace and based on a comparison of the current kinematic state to the historical database of kinematic states.

6. The device of claim 1, wherein the processor configured to determine the possible trajectory comprises the processor configured to assign a semantic cost to a region of the workspace based on a historical database of object information and based on a comparison of the objects to the historical database of object information.

7. The device of claim 6, wherein the object information comprises at least one of a type of the objects, a position within the workspace of the objects, a size of the objects, a weight of the objects, and a shape of the objects.

8. The device of claim 1, wherein the processor is further configured to generate the sequence of expected kinematic states between the current kinematic state and the goal further based on the semantic cost.

9. The device of claim 1, wherein the current kinematic state comprises at least one of a position of an arm segment of the collaborator in the workspace, a velocity of the arm segment, an acceleration of the arm segment, and a jerk of the arm segment.

10. The device of claim 9, wherein the possible trajectory comprises a geometric path of the arm segment from the current kinematic state to the expected goal.

11. The device of claim 10, wherein the possible trajectory is based on a path cost associated with the geometric path, wherein the path cost is based on distances of subsegments along the geometric path.

12. The device of claim 11, wherein the path cost is based on a semantic cost associated with each corresponding region traversed by each subsegment of the subsegments along the geometric path.

13. The device of claim 9, wherein the geometric path is based on a set of collision free paths defined by human-like movements of the arm segment.

14. An apparatus for predicting arm movements of a human collaborating with a robot in a collaboration workspace, the apparatus comprising an observation circuit configured to determine a current kinematic state of the human, determine occupancy information about objects in the collaboration workspace, and determine a goal of the human based on the occupancy information and the current kinematic state;

a geometric planner circuit configured to determine a possible trajectory for the human based on the goal and the current kinematic state;

a short-horizon circuit configured to:

model a next kinematic state of the human at a next time interval based on a matrix of coefficients that define how much each one of a set of previously observed kinematic states contributes to the next kinematic state; and determine a short-horizon trajectory for the human based on the set of previously observed kinematic states of the human towards the goal;

a controller circuit configured to:

determine a likelihood that the human will follow the possible trajectory, wherein the likelihood is based on the short-horizon trajectory, the goal, and the current kinematic state; and generate a movement instruction to control movement of the robot based on the likelihood.

15. A non-transitory computer readable medium, comprising instructions which, if executed, cause one or more processors to:

determine a current kinematic state of a collaborator in a workspace shared with a robot;

determine a goal of the collaborator based on occupancy information about objects in the workspace;

determine a possible trajectory for the collaborator based on the goal and the current kinematic state;

determine a short-horizon trajectory for the collaborator based on previously observed kinematic states of the collaborator towards the goal;

evaluate a multivariate normal distribution centered on each trajectory point of the possible trajectory;

determine a likelihood that the collaborator will follow the possible trajectory based on the short-horizon trajectory, the goal, the current kinematic state, the multivariate normal distribution; and generate a movement instruction to control movement of the robot based on the likelihood that the collaborator will follow the possible trajectory.

16. The non-transitory computer readable medium of claim 15, wherein the current kinematic state is associated with a current time and the previously observed kinematic states are associated with previous times before the current time.

17. The non-transitory computer readable medium of claim 15, wherein the instructions are further configured to cause the processor to iteratively redetermine the likelihood at a time interval, to redetermine the current kinematic state at each time interval, to redetermine the estimated goal at each time interval, to redetermine the possible trajectory at each time interval, and to redetermine the short-horizon trajectory at each time interval.

* * * * *